United States Patent
Simonjan (10) Patent No.: US 12,168,368 B2
(45) Date of Patent: Dec. 17, 2024

(54) WHEEL SPACER DISC FOR MOTOR VEHICLES

(71) Applicant: Klaus Wohlfarth, Fichtenberg (DE)

(72) Inventor: Edgar Simonjan, Vellberg (DE)

(73) Assignee: Klaus Wohlfarth, Fichtenberg (DE)

( * ) Notice: Subject to any disclaimer, the term of this patent is extended or adjusted under 35 U.S.C. 154(b) by 539 days.

(21) Appl. No.: 17/429,141

(22) PCT Filed: Jan. 30, 2020

(86) PCT No.: PCT/EP2020/052257
§ 371 (c)(1),
(2) Date: Aug. 6, 2021

(87) PCT Pub. No.: WO2020/160992
PCT Pub. Date: Aug. 13, 2020

(65) Prior Publication Data
US 2022/0080770 A1  Mar. 17, 2022

(30) Foreign Application Priority Data
Feb. 8, 2019  (DE) ...................... 20 2019 100 728.1

(51) Int. Cl.
*B60B 3/14* (2006.01)
*B60B 3/16* (2006.01)

(52) U.S. Cl.
CPC .............. *B60B 3/147* (2013.01); *B60B 3/16* (2013.01); *B60B 2900/3314* (2013.01); *B60B 2900/3315* (2013.01); *B60B 2900/351* (2013.01)

(58) Field of Classification Search
CPC ............ B60B 3/147; B60B 3/16; B60B 3/145
See application file for complete search history.

(56) References Cited

U.S. PATENT DOCUMENTS 3,820,851 A * 6/1974 Longo et al. ............. B60B 3/14
411/398
5,362,134 A * 11/1994 Carmona ................ B60B 3/145
301/9.1
(Continued)

FOREIGN PATENT DOCUMENTS

CN     205075582 U    3/2016
CN     107000473 A    8/2017
(Continued)

OTHER PUBLICATIONS

Notice of Reasons for Rejection with English translation issued in corresponding Japanese Application No. 2021-545911 dated Feb. 14, 2023 (12 pages).
(Continued)

*Primary Examiner* — Jason R Bellinger
(74) *Attorney, Agent, or Firm* — FLYNN THIEL, P.C.

(57) ABSTRACT

A wheel spacer disc for motor vehicles having
a plurality of wheel bolt openings,
a rim centering element for centering a rim relative to the wheel spacer disc, and
a wheel hub centering element for centering the wheel spacer disc relative to a wheel hub.

The plurality of wheel bolt openings are designed in each case as stepped openings for the respective partial reception of shaft nuts, wherein a section of the stepped openings having a greater diameter is arranged on a side of the wheel spacer disc on which the rim centering element is arranged.

9 Claims, 5 Drawing Sheets

(56) References Cited

U.S. PATENT DOCUMENTS

| | | | |
|---|---|---|---|
| 5,431,485 A | 7/1995 | Hayashi | |
| 5,454,628 A * | 10/1995 | Maiworm | B60B 1/08 |
| | | | 301/6.91 |
| 5,601,343 A * | 2/1997 | Hoffken | B60B 1/06 |
| | | | 301/111.04 |
| 5,636,905 A * | 6/1997 | Pagacz | B60B 3/165 |
| | | | 301/35.63 |
| 5,887,952 A * | 3/1999 | Gandellini | B60B 3/02 |
| | | | 301/35.63 |
| 9,463,665 B2 * | 10/2016 | Kleber | B60B 3/16 |
| 10,086,644 B2 | 10/2018 | Wohlfarth et al. | |
| 10,759,218 B2 * | 9/2020 | Wohlfarth | B60B 3/147 |
| 2006/0186727 A1 * | 8/2006 | McNeil | B60B 3/002 |
| | | | 301/105.1 |
| 2007/0158998 A1 * | 7/2007 | Aron | B60B 3/145 |
| | | | 301/110.5 |
| 2015/0176667 A1 | 6/2015 | Misumi et al. | |
| 2016/0046146 A1 * | 2/2016 | Wohlfarth | B60B 3/147 |
| | | | 301/35.627 |

FOREIGN PATENT DOCUMENTS

| | | |
|---|---|---|
| DE | 3012116 A1 | 8/1981 |
| DE | 3017116 A1 | 11/1981 |
| DE | 3442443 A1 | 5/1986 |
| DE | 8801548.3 U1 | 4/1988 |
| DE | 4312438 C1 | 10/1994 |
| DE | 9412645.3 U1 | 11/1994 |
| DE | 19548468 A1 | 10/1997 |
| DE | 19936225 A1 | 2/2001 |
| DE | 20205052 U1 | 8/2002 |
| JP | 5382101 A2 | 12/1951 |
| JP | 5893655 A | 6/1983 |
| JP | 63165201 U | 10/1988 |
| JP | 4129302 U | 11/1992 |
| JP | 75801 U | 1/1995 |
| JP | 3012991 U | 6/1995 |
| JP | 7228101 A | 8/1995 |
| JP | 3062622 U | 10/1999 |
| JP | 3098458 U | 3/2004 |
| JP | 2005138728 A | 6/2005 |
| JP | 3118486 U | 1/2006 |
| JP | 3175052 U | 4/2012 |
| JP | 2012512077 A | 5/2012 |
| JP | 5499201 | 10/2013 |
| JP | 201447871 A | 3/2014 |
| JP | 2015529166 A | 10/2015 |
| JP | 3206534 U | 9/2016 |
| JP | 3211544 U | 7/2017 |

OTHER PUBLICATIONS

Chinese Office Action issued in corresponding Chinese Application No. 202080013059.8 dated Sep. 15, 2023 (8 pages).
German Search Report issued in corresponding German Application No. 20 2019 100 728.1, date of mailing Jun. 27, 2019 (8 pages).
Japanese Office Action with English translation issued in corresponding Japanese Application No. 2021-545911 dated Jul. 26, 2022 (12 pages).
International Search Report with English Translation issued in corresponding International Application No. PCT/EP2020/052257 date of mailing May 15, 2020 (6 pages)
Written Opinion of International Searching Authority issued in corresponding International Application No. PCT/EP2020/052257 dated May 15, 2020 (7 pages).
Chinese Office Action issued in corresponding Chinese Application No. 202080013059.8 dated Apr. 12, 2024 (8 pages).
Japanese Notice of Allowance issued in corresponding Japanese Application No. 2021-545911, issued Jun. 24, 2024 (2 pages).

* cited by examiner

WHEEL SPACER DISC FOR MOTOR VEHICLES

TECHNICAL FIELD

The invention relates to a wheel spacer disc for motor vehicles comprising a plurality of wheel bolt openings, comprising a wheel centering element for centering a wheel relative to the wheel spacer disc, and comprising a wheel hub centering element for centering the wheel spacer disc relative to a wheel hub. The invention further relates to an arrangement comprising a wheel hub, a wheel spacer disc and a wheel for motor vehicles. The invention further relates to an arrangement comprising a wheel hub, a wheel spacer disc and a wheel for motor vehicles.

BACKGROUND AND SUMMARY

One object of the invention is to improve a wheel spacer disc regarding the ability to mount a wheel on the wheel spacer disc, as well as the wheel together with the wheel spacer disc on a wheel hub.

According to the invention, a wheel spacer disc for motor vehicles is provided, said wheel spacer disc comprising a plurality of wheel bolt openings, comprising a wheel centering element for centering a wheel relative to the wheel spacer disc and comprising a wheel hub centering element for centering the wheel spacer disc relative to a wheel hub, wherein the plurality of wheel bolt openings are designed in each case as stepped openings for the respective partial reception of shaft nuts, wherein a section of the stepped openings having a greater diameter is arranged on a side of the wheel spacer disc on which the wheel centering element is arranged.

A wheel spacer disc, also called a spacer disc, in the context of the invention is a disc which serves to achieve track widening on a motor vehicle and thus an increase in the track width of the motor vehicle. The wheel spacer disc may have various embodiments. An embodiment of the wheel spacer disc in an annular shape is particularly advantageous, wherein elements of the wheel spacer disc are arranged as symmetrically as possible about a central longitudinal axis of the wheel spacer disc. A symmetrical embodiment of the wheel spacer disc is particularly advantageous in terms of a mass distribution about a rotational axis which in an ideal case corresponds to the central longitudinal axis of the wheel spacer disc in order to avoid possible imbalance during a rotation of the wheel spacer disc.

In a preferred embodiment, the wheel spacer disc comprises a center opening. The center opening is to be understood as a recess which extends along the central longitudinal axis of the wheel spacer disc and through the wheel spacer disc and may receive, at least partially, a centering element of the wheel hub, with the centering element of the wheel hub projecting into the center opening or penetrating through the center opening. The center opening is particularly advantageously arranged centrally on the wheel spacer disc. Moreover, the center opening has a circumferential wall which has a height (along the central longitudinal axis of the wheel spacer disc) which in turn corresponds to a thickness of the wheel spacer disc. In one embodiment, the wheel spacer disc may have a shaping or recess which is arranged centrally on the wheel spacer disc and which may extend along a central longitudinal axis of the wheel spacer disc. In this case the wheel hub centering element may be arranged on an inner face of the shaping for centering the wheel spacer disc relative to the wheel hub, and the wheel centering element may be arranged on an outer face of the shaping for centering the wheel relative to the wheel spacer disc.

The wheel spacer disc for motor vehicles also has the plurality of wheel bolt openings, in particular five wheel bolt openings, which are designed as stepped openings. In particular, the wheel spacer disc has no further wheel bolt openings or openings configured as a stepped opening for inserting bolts and the like, so that all of the wheel bolt openings are designed as stepped openings for partially receiving shaft nuts. The stepped openings serve for at least partially receiving shaft nuts. In this case the stepped openings, on the one hand, have the greater diameter for receiving the shaft nuts and, on the other hand, a smaller diameter for receiving the stud bolts of the wheel hub. In this case, the section of the stepped openings having the greater diameter is arranged on the side of the wheel spacer disc on which the wheel centering element is also arranged for centering the wheel relative to the wheel spacer disc, and the section of the stepped openings having the smaller diameter is arranged on the side of the wheel spacer disc remote from the wheel centering element. So that the section of the stepped openings having the greater diameter is able to receive the shaft nuts at least partially, the greater diameter has at least a diameter which is configured to be equal to or greater than the diameter of a shaft of the shaft nuts.

In a development of the invention it may be provided that the wheel spacer disc has a thickness along a central longitudinal axis of the wheel spacer disc which is less than 15 mm, in particular 2 mm, in particular 3 mm, 5 mm, 8 mm or 10 mm, in particular is between 2 mm and 15 mm.

In a development of the invention it may be provided that a section of the stepped openings having a smaller diameter has a thickness along the central longitudinal axis of the wheel spacer disc which is between 2 mm and 5 mm.

The section of the stepped openings having the smaller diameter in this case is designed such that it is configured to be sufficiently stable in order to center the wheel spacer disc for motor vehicles on a plurality of stud bolts of the wheel hub sufficiently accurately, and does not exceed a thickness along the central longitudinal axis of the wheel spacer disc which could hinder the respective partial reception of the shaft nuts during a screwing-in process. Particularly advantageously, the section of the stepped openings having the smaller diameter has a thickness along the central longitudinal axis of the wheel spacer disc of 2 mm to 5 mm.

In a development of the invention it may be provided that the section of the stepped openings having the smaller diameter has at least a difference in diameter relative to the section of the stepped openings having the greater diameter, which corresponds to twice the wall thickness of the shaft nuts.

In order to guarantee that the shaft nuts are respectively partially received, at least one spacing which corresponds to the wall thickness of the shaft nuts is required between a circumferential wall of the section having the greater diameter of the stepped openings and the plurality of stud bolts. Particularly preferably, this spacing is at least as great as the wall thickness of the shaft nuts or greater. The spacing between the circumferential wall of the section having the greater diameter and the plurality of stud bolts is predetermined by the section of the stepped openings having the smaller diameter. The section of the stepped openings having the smaller diameter thus extends further into the wheel bolt openings, at least by the difference in diameter relative to the section of the stepped openings having the greater diameter, which corresponds to twice the wall thickness of the shaft nuts. Thus, a partial penetration of the shaft nuts into the stepped openings is not hindered during a mounting process.

In a development of the invention it may be provided that the wheel centering element and the wheel hub centering element are configured in each case integrally with the wheel spacer disc.

In a preferred embodiment the wheel centering element extends out of the wheel spacer disc circumferentially around the center opening. In this case the wheel centering element also has a wheel centering surface which is arranged on the wheel centering element and which is arranged remote from the central longitudinal axis of the wheel spacer disc. Moreover, in the preferred embodiment the wheel hub centering element is arranged circumferentially on the center opening and facing the central longitudinal axis of the wheel spacer disc. Thus, in the preferred embodiment the wheel centering element and the wheel hub centering element are configured from the same material as the wheel spacer disc. The wheel spacer disc is particularly advantageously configured from aluminum or any other material which is relatively lightweight and yet robust.

In a development of the invention it may be provided that the wheel centering element and the wheel hub centering element are configured as a separate component, in particular as an annular component.

A component which has the wheel centering element and the wheel hub centering element may be provided separately from the wheel spacer disc. Particularly advantageously, the separate component is designed as an annular component and is able to be inserted into the center opening of the wheel spacer disc. To this end, the center opening of the wheel spacer disc has a substantially greater diameter than the centering element of the wheel hub. The separate component is thus able to be inserted into the center opening of the wheel spacer disc. For example, the separate component is a ring which is configured from plastics and which is able to be fastened by means of a latching device to a circumferential wall of the center opening of the wheel spacer disc. This ring has the wheel hub centering element and the wheel centering element. The wheel centering element extends, in the latched state of the separate component in the center opening of the wheel spacer disc, substantially parallel to and along the central longitudinal axis of the wheel spacer disc away from the wheel spacer disc. Moreover, the separate component, which is shaped as a ring, has the wheel hub centering element on an inner face. The wheel hub centering element extends along the separate component substantially parallel to and in the direction of the central longitudinal axis of the wheel spacer disc, whilst it faces the central longitudinal axis of the wheel spacer disc. The wheel centering element is arranged, however, remote from the central longitudinal axis of the wheel spacer disc and extends on an outer face of the separate component. The separate component thus serves, firstly, for centering the wheel spacer disc relative to the wheel hub, and secondly, for centering the wheel spacer disc relative to the wheel. This separate component with the latching device, the wheel centering element and the wheel hub centering element may be configured, for example, from plastics, a material similar to plastics or any other suitable material. In this case, the separate component has to be sufficiently stable in order to be able to ensure the centering of the wheel relative to the wheel spacer disc and the centering of the wheel spacer disc relative to the wheel hub.

In a development of the invention it may be provided that the wheel centering element is arranged circumferentially around a center opening of the wheel spacer disc and extends out of the wheel spacer disc along the central longitudinal axis of the wheel spacer disc.

The wheel centering element extends substantially circumferentially around the center opening of the wheel spacer disc, out of said wheel spacer disc. In this case, the wheel centering surface of the wheel centering element is oriented substantially parallel to the central longitudinal axis of the wheel spacer disc. This wheel centering surface may run in the same direction as the wheel centering element extending out of the wheel spacer disc along the central longitudinal axis of the wheel spacer disc, conically toward the central longitudinal axis of the wheel spacer disc. Thus, it is possible to compensate for tolerances when pushing the wheel spacer disc onto the wheel. This is relevant, in particular, for manufacturing tolerances which may play a role both in the wheel and in the wheel spacer disc and may be compensated by the wheel centering element running conically toward the central longitudinal axis.

In a development of the invention it may be provided that the wheel hub centering element is configured as a circumferential wall around the center opening.

Whilst the circumferential wall is oriented at least substantially parallel to the central longitudinal axis of the wheel spacer disc, in one embodiment the circumferential wall and thus the wheel hub centering element may also run slightly conically toward the central longitudinal axis and in the same direction in which the wheel centering element also extends out of the wheel spacer disc. Thus, it is possible to compensate for tolerances, in particular manufacturing tolerances, of the wheel hub and the wheel spacer disc when pushing the wheel spacer disc onto the wheel hub and/or onto the centering element of the wheel hub. The wheel hub centering element, provided as a circumferential wall around the center opening, thus tapers toward the central longitudinal axis of the wheel spacer disc in the same direction as that of the wheel centering element extending out of the wheel spacer disc.

According to the invention an arrangement comprising a wheel hub, a wheel spacer disc according to the invention and a wheel for motor vehicles is provided, wherein the wheel hub has at least one centering element and a plurality of stud bolts for fastening the wheel, wherein the wheel spacer disc is centered relative to the wheel hub, wherein the wheel is centered by means of the wheel centering element relative to the wheel spacer disc, wherein a plurality of wheel bolt openings of the wheel spacer disc are oriented so as to be aligned with a plurality of wheel bolt openings of the wheel, and the plurality of stud bolts of the wheel hub are arranged in each case at least partially in the plurality of wheel bolt openings of the wheel spacer disc, wherein a plurality of shaft nuts are provided for fastening the wheel and the wheel spacer disc to the wheel hub, wherein the plurality of shaft nuts are screwed in each case onto the plurality of stud bolts of the wheel hub, wherein the shaft nuts project through the plurality of wheel bolt openings of the wheel and wherein the plurality of shaft nuts in the region of stepped openings project at least partially into the section of the stepped openings of the wheel spacer disc having the greater diameter.

In a mounted state, a bearing surface of the wheel hub is in abutment with a wheel hub bearing surface of the wheel spacer disc. Furthermore, a wheel bearing surface of the wheel spacer disc is in abutment with a bearing surface of the wheel. The stud bolts of the wheel hub have a specific length. The stud bolts of the wheel hub project through the wheel bolt openings of the wheel spacer disc and at least into the wheel bolt openings of the wheel. With an increase in the thickness of the wheel spacer disc along the central longitudinal axis of the wheel spacer disc, therefore, the projection of the stud bolts into the wheel bolt openings of the wheel reduces. Particularly advantageously, therefore, a shaft length of the shaft nuts is dimensioned such that a sufficient threaded engagement of the shaft nuts on the plurality of stud bolts is ensured. For the sufficient threaded engagement, the shaft nuts in the region of the shaft openings project at least partially into the section of the stepped openings of the wheel spacer disc which is designed with the greater diameter.

In a development of the invention it may be provided that the shaft length of the plurality of shaft nuts depends on a thickness of the wheel spacer disc.

A spacing of the wheel from the wheel hub increases with an increasing thickness of the wheel spacer disc. Since the plurality of stud bolts are fixed to the wheel hub, with the increasing thickness these stud bolts are increasingly surrounded by the wheel bolt openings of the wheel spacer disc in the direction along the central longitudinal axis of the wheel spacer disc and away from the wheel hub. So that a sufficient threaded engagement of the shaft nuts on the plurality of stud bolts is still guaranteed, the shaft length of the shaft nuts has to be designed to be longer and thus dependent on the thickness of the wheel spacer disc.

In a development of the invention it may be provided that a step height of the stepped bores depends on the thickness of the wheel spacer disc.

According to the invention an arrangement comprising a wheel hub, a wheel spacer disc according to the invention and a wheel for motor vehicles is provided, wherein the wheel hub has at least one centering element and has a plurality of stud bolts for fastening the wheel, wherein the wheel spacer disc is centered relative to the wheel hub, wherein the wheel is centered by means of the wheel centering element relative to the wheel spacer disc, wherein a plurality of wheel bolt openings of the wheel spacer disc are oriented so as to be aligned with a plurality of wheel bolt openings of the wheel and the stud bolts of the wheel hub are arranged in each case at least partially in the wheel bolt openings of the wheel spacer disc, wherein a plurality of shaft nuts are provided for fastening the wheel and the wheel spacer disc to the wheel hub, wherein the shaft nuts are screwed in each case onto the stud bolts of the wheel hub, wherein the stud bolts are provided with sleeves, wherein the sleeves project in each case into the wheel bolt openings of the wheel spacer disc from a bearing surface of the wheel hub and ensure a spacing between a lateral surface of the stud bolts from a circumferential wall of the wheel bolt openings of the wheel spacer disc and wherein the shaft nuts project through the wheel bolt openings of the wheel, wherein the shaft nuts in the region of the wheel bolt openings project at least partially into the wheel bolt openings of the wheel spacer disc.

In one embodiment it may be provided that each stud bolt is provided with a sleeve. The sleeves in this case may be designed from plastics or from a material similar to plastics or even from any other suitable material. The sleeves are pushed onto the stud bolts and determine a spacing from the circumferential wall of the plurality of wheel bolt openings of the wheel spacer disc. Due to the spacing of the lateral surface of the stud bolts from the circumferential wall of the wheel bolt openings of the wheel spacer disc it is ensured that the shaft nuts project at least partially into the wheel bolt openings of the wheel spacer disc. The sleeves may be pushed onto the stud bolts.

In a development of the invention it may be provided that the spacing between the lateral surface of the plurality of stud bolts from the circumferential wall of the plurality of wheel bolt openings corresponds at least to a wall thickness of the plurality of shaft nuts.

So that the shaft nuts, whilst they are screwed onto the stud bolts, are able to project into the wheel bolt openings of the wheel spacer disc, it has to be ensured that the spacing between the lateral surface of the stud bolts and the circumferential wall of the wheel bolt openings during a screwing-in process is at least as great as the wall thickness of the shaft nuts.

In a development of the invention it may be provided that the sleeves have in each case a thickness along the central longitudinal axis of the wheel spacer disc which is between 2 mm and 5 mm.

Particularly advantageously the sleeves have in each case a thickness along the central longitudinal axis of the wheel spacer disc of 2 mm to 5 mm. The thickness is important, in particular, so that a centering of the wheel bolt openings of the wheel spacer disc onto the stud bolts and thus onto the sleeves which are pushed onto the stud bolts is successful.

BRIEF DESCRIPTION OF THE DRAWINGS

Further advantages and aspects of the invention are disclosed in the following description of preferred exemplary embodiments of the invention which are described hereinafter with reference to the figures, in which.

DETAILED DESCRIPTION OF THE EXEMPLARY EMBODIMENTS

Figure 1:
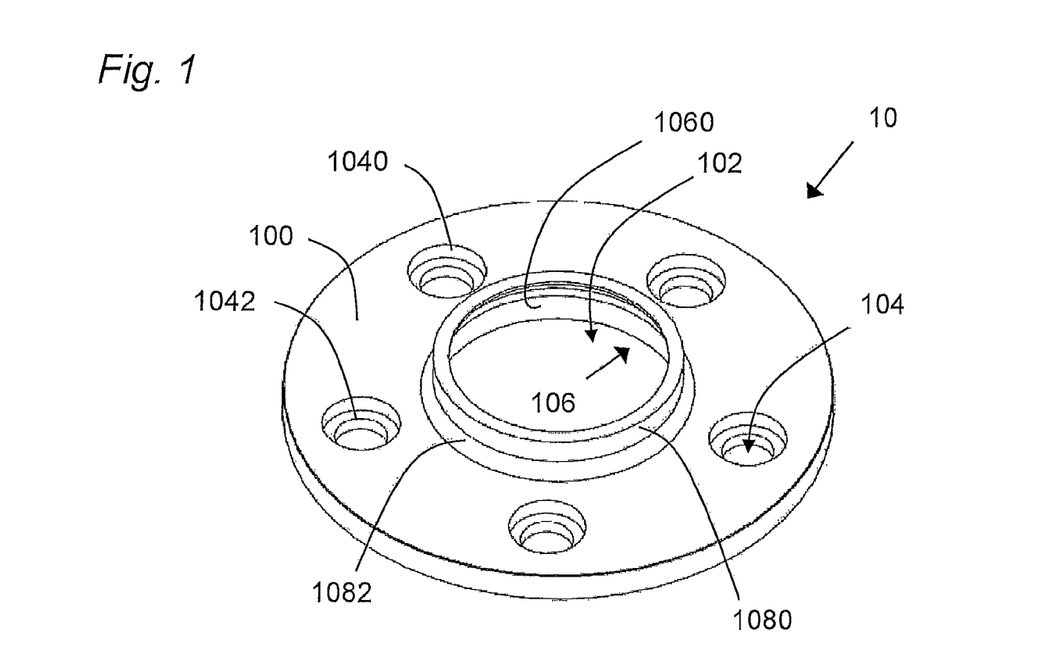
FIG. 1 shows an isometric view obliquely from above of a wheel spacer disc of FIG. 1.

FIG. 1 shows an isometric view obliquely from above of a wheel spacer disc 10 according to a first embodiment of the invention.

The wheel spacer disc 10 has a center opening 102 and five wheel bolt openings 104. The wheel bolt openings 104 are configured in each case as stepped openings. The wheel bolt openings 104 have a first section 1040 with a greater diameter and a second section 1042 with a smaller diameter. Furthermore, the five wheel bolt openings 104 are located on a diameter which is located between an external diameter of the wheel spacer disc 10 and a diameter of the center opening 102.

Figure 3:
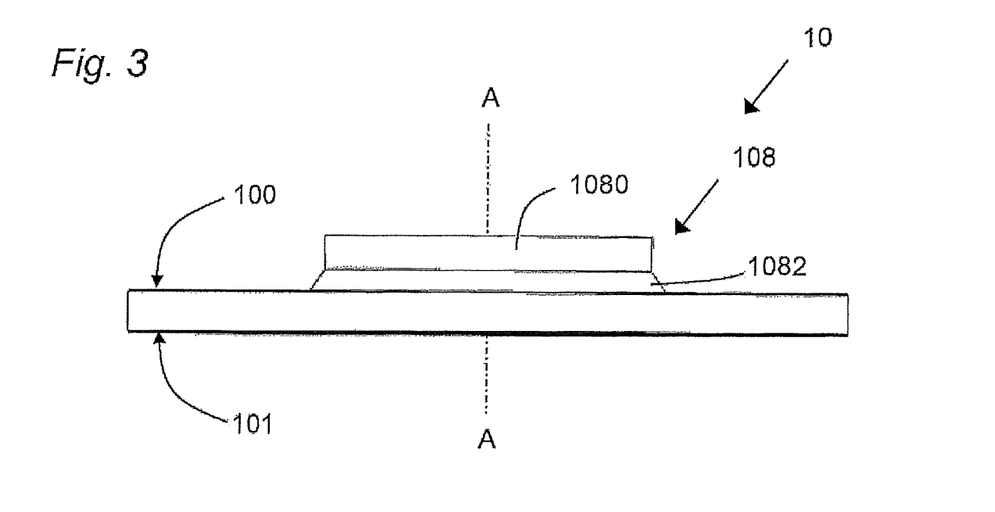
FIG. 3 shows a side view of the wheel spacer disc of FIG. 1.

Moreover, a wheel hub centering element 106 is provided, said wheel hub centering element being arranged along a central longitudinal axis A of the wheel spacer disc 10 shown in FIG. 3 and a wheel centering element 108 shown in FIG. 1. Both the wheel hub centering element 106 and the wheel centering element 108 extend at least partially out of a circumferential wall of the center opening 102.

More specifically, the wheel hub centering element 106 is configured from the circumferential wall of the center opening 102 and has a wheel hub centering surface 1060. The wheel hub centering surface 1060 may be configured to be slightly conical in order to compensate for tolerances, in particular for manufacturing tolerances, when positioning the wheel spacer disc 10 on a centering element 202 of the wheel hub 20, not shown here. A surface 1062 of the wheel hub centering element 106 running conically to the central longitudinal axis A of the wheel spacer disc 10 adjoins the wheel hub centering surface 1060.

Moreover, the wheel centering element 108 extends out of a wheel bearing surface 100. In this case, a wheel centering surface 1080 of the wheel centering element 108 is conical so that a compensation of manufacturing tolerances and a centering of a wheel 30, not shown here, on the wheel spacer disc 10 is possible. Moreover, a surface 1082 of the wheel centering element 108 running from the wheel bearing surface 100 conically to the wheel centering surface 1080 is provided.

Figure 2:
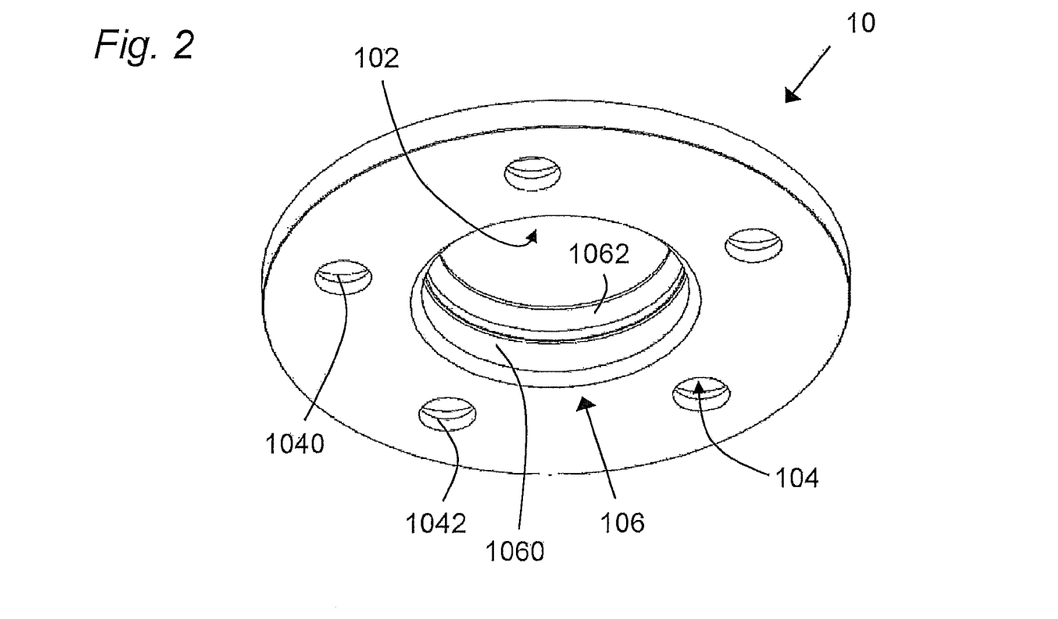
FIG. 2 shows an isometric view obliquely from below of the wheel spacer disc of FIG. 1.

FIG. 2 shows an isometric view obliquely from below of the wheel spacer disc 10 according to the first embodiment of the invention. FIG. 2 substantially shows the features which have already been shown and described in FIG. 1. In comparison with FIG. 1, FIG. 2 shows the wheel hub bearing surface 101 which in a mounted state bears against a wheel hub 20 (see FIGS. 6 and 7). Moreover, in FIG. 2 the center opening 102, the five wheel bolt openings 104, the wheel hub centering element 106 comprising the wheel hub centering surface 1060 and the surface 1062 are shown.

FIG. 3 shows a side view of the wheel spacer disc 10 according to the first embodiment of the invention. FIG. 3 shows substantially the features which have already been shown and described in FIGS. 1 and 2. The wheel centering element 108 and the wheel bearing surface 100, the wheel hub bearing surface 101 and the central longitudinal axis A are shown. Moreover, the wheel centering surface 1080 and the surface 1082 of the wheel centering element 108 are visible.

Figure 4:
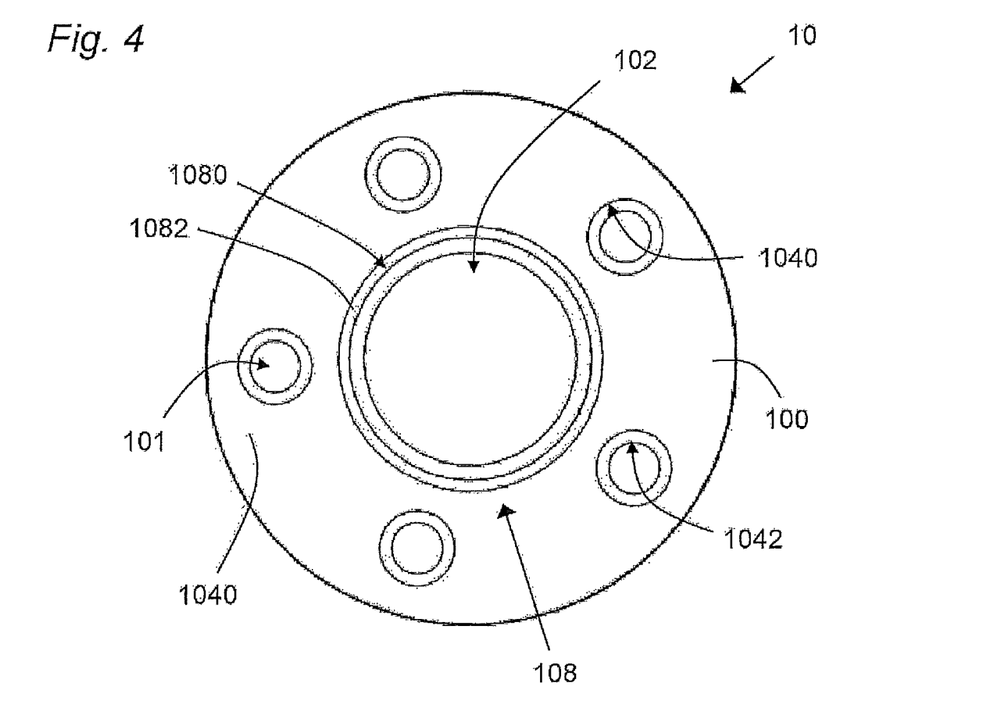
FIG. 4 shows a plan view of the wheel spacer disc of FIG. 1.

FIG. 4 shows a plan view of the wheel spacer disc 10 according to the first embodiment of the invention. FIG. 4 substantially shows the features which have already been shown and described in FIGS. 1 to 3. The wheel bearing surface 100, the center opening 102 and the five wheel bolt openings 104 in the form of stepped openings are shown. In this case, it is possible to see a difference in diameter between the first section 1040 having the greater diameter and the second section 1042 having the smaller diameter of the wheel bolt openings 104. The wheel centering element 108 is shown in plan view, and both the circumferential wheel surface 1080 and also the surface 1082 of the wheel centering element 108 are shown.

Figure 5:
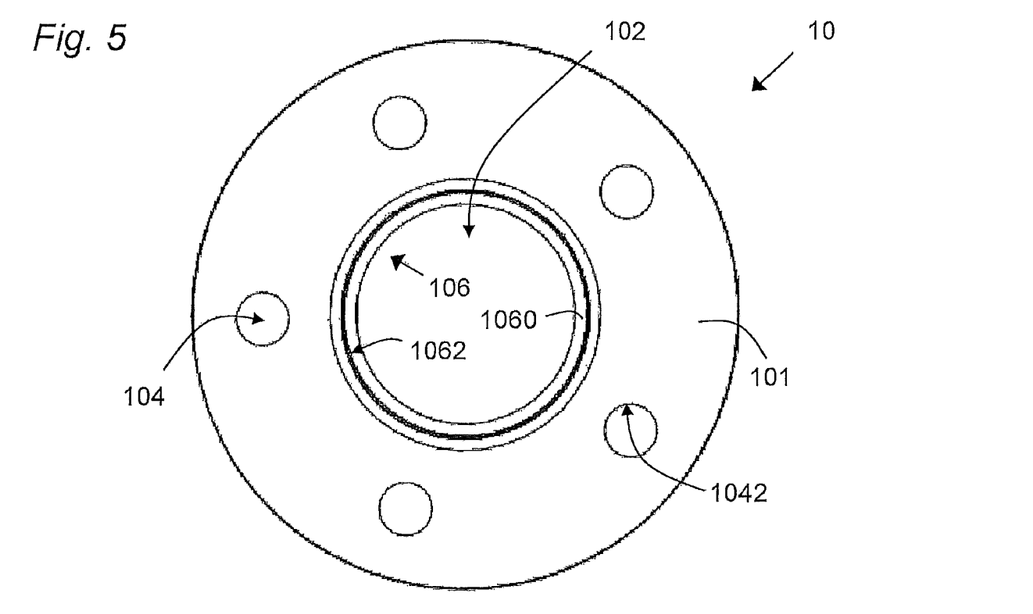
FIG. 5 shows a view from below of the wheel spacer disc of FIG. 1.

FIG. 5 shows a view from below of the wheel spacer disc 10 according to the first embodiment of the invention. FIG. 5 shows substantially the features which have already been shown and described in FIGS. 1 to 4. The wheel hub bearing surface 101, the center opening 102 and the five wheel bolt openings 104 designed as stepped openings are shown. In this case, in the view from below shown in FIG. 5 of the wheel spacer disc 10, merely the second section 1042 having the smaller diameter of the wheel bolt openings 104 is visible. The wheel hub centering element 106 with the wheel hub centering surface 1060 and the surface 1062 are also illustrated.

Figure 6:
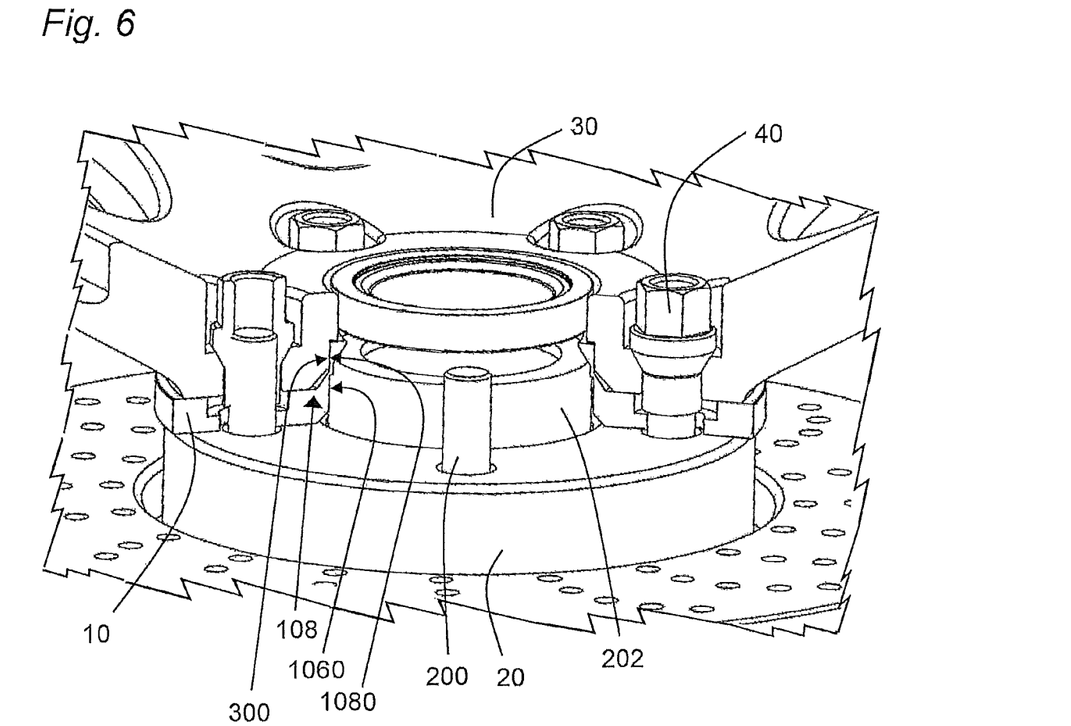
FIG. 6 shows a partial sectional isometric view obliquely from above of an arrangement with a wheel hub, a wheel and the wheel spacer disc of FIG. 1.

FIG. 6 shows a partial sectional isometric view obliquely from above of an arrangement with a wheel hub 20, a wheel 30 and the wheel spacer disc 10 according to the first embodiment of the invention. The wheel spacer disc 10 is located between the wheel hub 20 and the wheel 30 and bears both against the wheel hub 20 and against the wheel 30. The wheel 30 is fastened by a plurality of shaft nuts 40 to stud bolts 200 of the wheel hub 20 so that the wheel spacer disc 10 is clamped between the wheel 30 and the wheel hub 20. Only three shaft nuts 40 and another shaft nut 40 in section of the five actual shaft nuts 40 are illustrated in the detail of FIG. 6. It may be seen that the wheel spacer disc 10 is centered relative to the centering element 202 of the wheel hub 20, since the wheel hub centering surface 1060 bears against the centering element 202 of the wheel hub 20. The wheel 30 is centered relative to the wheel spacer disc 10 on the wheel centering element 108 of the wheel spacer disc 10 since the wheel centering surface 1080 bears against the centering surface 300 of the wheel 30.

Figure 7:
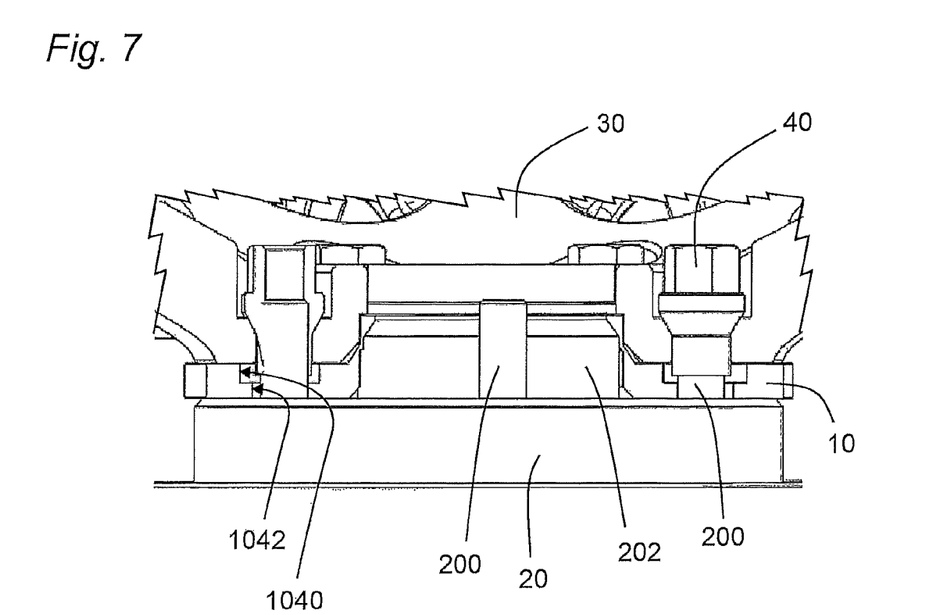
FIG. 7 shows a partial sectional side view of the arrangement according to FIG. 6 with the wheel hub, the wheel and the wheel spacer disc of FIG. 1.

FIG. 7 shows a partial sectional side view of the arrangement according to FIG. 6 comprising the wheel hub 20, the wheel 30 and the wheel spacer disc 10 according to the first embodiment of the invention. FIG. 7 essentially illustrates the features which have already been described and shown in FIG. 6.

Figure 8:
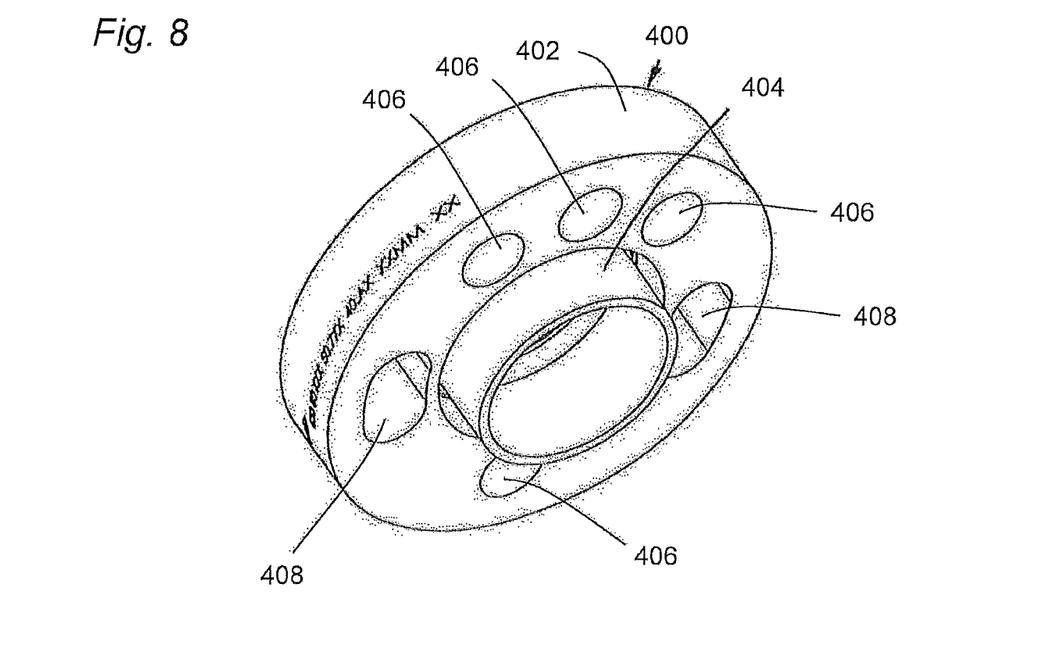
FIG. 8 shows an isometric view obliquely from below of a wheel spacer disc according to a second embodiment of the invention.

FIG. 8 shows an isometric view obliquely from below of a wheel spacer disc 400 according to a second embodiment of the invention. The wheel spacer ring or disc 400 is configured in two parts and has a wheel spacer ring 402 and a wheel spacer centering element 404.

The wheel spacer ring 402 is provided with a total of six wheel bolt openings 406, 408, wherein four wheel bolt openings 406 are configured as stepped bores with a circular cross section and two wheel bolt openings 408 are configured as stepped bores in the shape of a curved slot. The wheel bolt openings 406, 408 are configured and arranged such that different hole patterns of wheels and wheel hubs may be accommodated by one and the same wheel spacer ring 402. The stepped bores are also configured as has been described with reference to the first embodiment of FIGS. 1 to 8.

The wheel spacer centering element 404 is fastened by latching elements, not identifiable in FIG. 8, in a center opening of the wheel spacer ring 402 and is provided with a wheel hub centering surface and a wheel centering surface. By changing the wheel spacer centering element 404 different wheel hub diameters and wheel opening diameters may be accommodated. The wheel spacer centering element 404 may consist, for example, of plastics.

Figure 9:
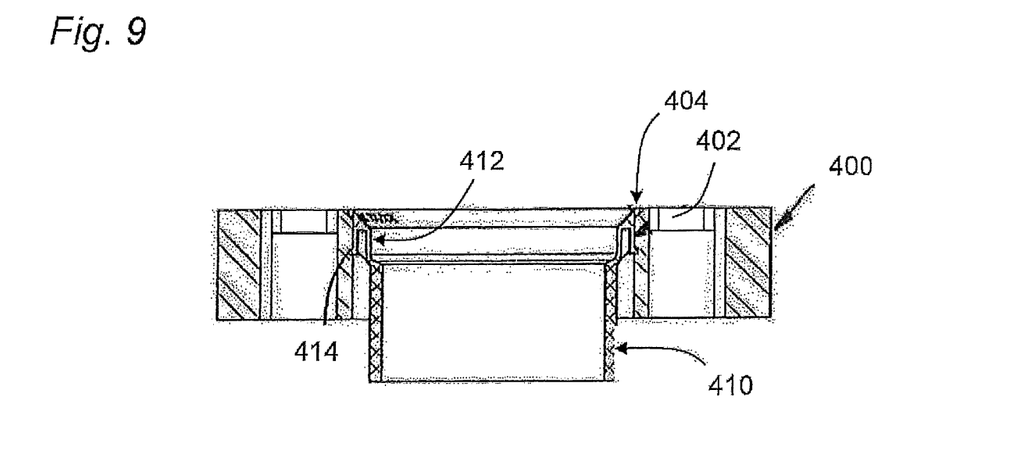
FIG. 9 shows a sectional side view of the wheel spacer disc of FIG. 8.

FIG. 9 shows a sectional side view of the wheel spacer disc 400 of FIG. 8. The wheel spacer centering element 404 is fastened by means of latching arms 414 to the wheel spacer ring 402. To this end, latching lugs at the free ends of the latching arms 414 engage in a circumferential groove in the center opening of the wheel spacer ring 402. The wheel centering surface 410 and the wheel hub centering surface 412 can be seen on the wheel spacer centering element 404. Both the wheel centering surface 410 and the wheel hub centering surface 412 may be slightly conical so that they widen upwardly in the view of FIG. 9, in order to compensate for tolerances of the wheel and the wheel hub and to ensure a reliable centering.

The invention claimed is:

1. An arrangement for a motor vehicle comprising:
a wheel hub, the wheel hub comprising:
at least one centering element; and
a plurality of stud bolts;
a wheel, the wheel comprising:
an outer rim for mounting a tire; and
a plurality of wheel bolt openings disposed inwardly of the outer rim;
a wheel spacer disc, the wheel spacer disc comprising:
first and second sides facing away from one another;
a plurality of wheel bolt openings, all of the wheel bolt openings of the plurality of wheel bolt openings of the wheel spacer disc including a stepped configuration having a first section and a second section, the first section having a greater diameter than a diameter of the second section, the plurality of wheel bolt openings of the wheel spacer disc being aligned with the respective wheel bolt openings of the wheel, the plurality of stud bolts of the wheel hub extending within the respective wheel bolt openings of the wheel spacer disc and within the respective wheel bolt openings of the wheel;
a wheel centering element disposed and configured to center the wheel relative to the wheel spacer disc, the wheel centering element being disposed on the first side of the wheel spacer disc and the first sections of the wheel bolt openings of the wheel spacer disc open at the first side of the wheel spacer disc; and
a wheel hub centering element disposed and configured to center the wheel spacer disc relative to the wheel hub;
the arrangement further comprising a plurality of shaft nuts, the shaft nuts projecting through the wheel bolt openings of the wheel and at least partially into the first sections of the wheel bolt openings of the wheel spacer disc, and each of the shaft nuts is screwed onto one of the stud bolts of the wheel hub to fasten the wheel and the wheel spacer disc to the wheel hub.

2. The arrangement as claimed in claim 1, wherein the wheel spacer disc has a thickness, measured along a central longitudinal axis of the wheel spacer disc, less than 15 mm.

3. The arrangement as claimed in claim 1, wherein each of the second sections of the stepped openings have a thickness, measured along a central longitudinal axis of the wheel spacer disc, between 2 mm and 5 mm.

4. The arrangement as claimed in claim 1, wherein the wheel centering element and the wheel hub centering element are integral components of the wheel spacer disc.

5. The arrangement as claimed in claim 1, wherein the wheel spacer disc comprises a two part component, one of the two parts comprising the wheel centering element and the other of the two parts comprising the wheel hub centering element.

6. The arrangement as claimed in claim 1, wherein the wheel spacer disc includes a center opening and a central axis, the wheel centering element being arranged circumferentially around the center opening and extending out of the wheel spacer disc along the central axis.

7. The arrangement as claimed in claim 6, wherein the wheel hub centering element is configured as a circumferential wall extending around the center opening.

8. The arrangement as claimed in claim 1, wherein the wheel spacer disc has a thickness and the shaft nuts each have a shaft length based on the thickness of the wheel spacer disc.

9. The arrangement as claimed in claim 1, wherein the wheel spacer disc has a thickness, and the first sections of the wheel bolt openings of the wheel spacer disc each have a step height based on the thickness of the wheel spacer disc.

* * * * *